United States Patent [19]

Sullivan et al.

[11] Patent Number: 4,702,406
[45] Date of Patent: Oct. 27, 1987

[54] FORMING STABLE WELDED JOINTS BETWEEN DISSIMILAR METALS

[75] Inventors: Dennis Sullivan; Richard J. Bloch, both of Raleigh, N.C.

[73] Assignee: Carolina Power & Light Company, Raleigh, N.C.

[21] Appl. No.: 919,857

[22] Filed: Oct. 16, 1986

[51] Int. Cl.[4] .............................................. B23K 1/04
[52] U.S. Cl. .................................. 228/200; 228/226; 228/227; 148/127; 285/173
[58] Field of Search .............. 228/200, 216, 226, 227, 228/263.15; 219/137 WM, 76.12, 76.14; 148/127; 285/173, 286

[56] References Cited

U.S. PATENT DOCUMENTS

| | | |
|---|---|---|
| 2,759,249 | 8/1956 | Eberle . |
| 2,763,923 | 9/1956 | Webb . |
| 2,769,227 | 11/1956 | Sykes et al. . |
| 2,963,129 | 12/1960 | Eberle . |
| 3,052,016 | 9/1962 | Zimmer . |
| 3,163,501 | 12/1964 | Zimmer et al. . |
| 3,239,929 | 3/1966 | Ellis et al. . |
| 4,062,705 | 12/1977 | Gondo et al. ........................ 148/127 |
| 4,209,123 | 6/1980 | Jay . |
| 4,333,670 | 6/1982 | Holko . |
| 4,333,671 | 6/1982 | Holko . |
| 4,354,883 | 10/1982 | Terasaki ............................. 148/127 |

FOREIGN PATENT DOCUMENTS

| | | | |
|---|---|---|---|
| 28696 | 2/1982 | Japan ................................... | 228/200 |
| 712210 | 1/1980 | U.S.S.R. ....................... | 219/137 WM |
| 742474 | 6/1980 | U.S.S.R. ............................... | 148/127 |

Primary Examiner—M. Jordan
Attorney, Agent, or Firm—Bell, Seltzer, Park & Gibson

[57] ABSTRACT

A method of forming a stable welded joint between low alloy steels and austenitic stainless alloy steels which is characterized by increased resistance to chemical corrosion and mechanical stress and which has a greatly extended service lifetime. The method comprises forming a deposit of a low alloy steel containing niobium onto a portion of low alloy steel to be welded; heating the deposit to a first temperature at which all carbides present therein have dissolved; quenching the deposit and forming a solid solution of the elements of the dissolved carbides; and reheating the deposit for a time period and at a second temperature sufficient to form niobium carbides therein containing substantially all of the carbon present in the deposit. The austenitic stainless steel portion is welded to the deposit using a substantially nonferrous nickel-based alloy as the weld filler material, thereby joining the low alloy steel portion to the austenitic stainless steel portion.

26 Claims, 5 Drawing Figures

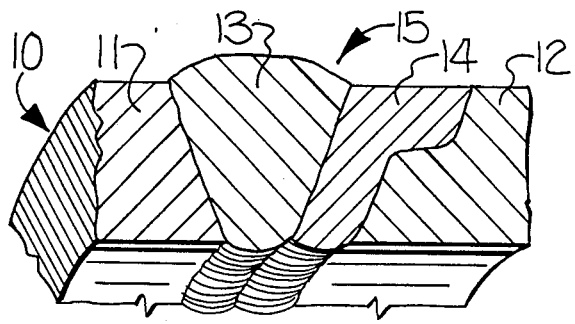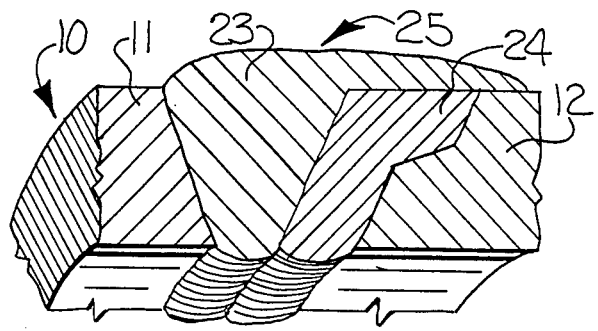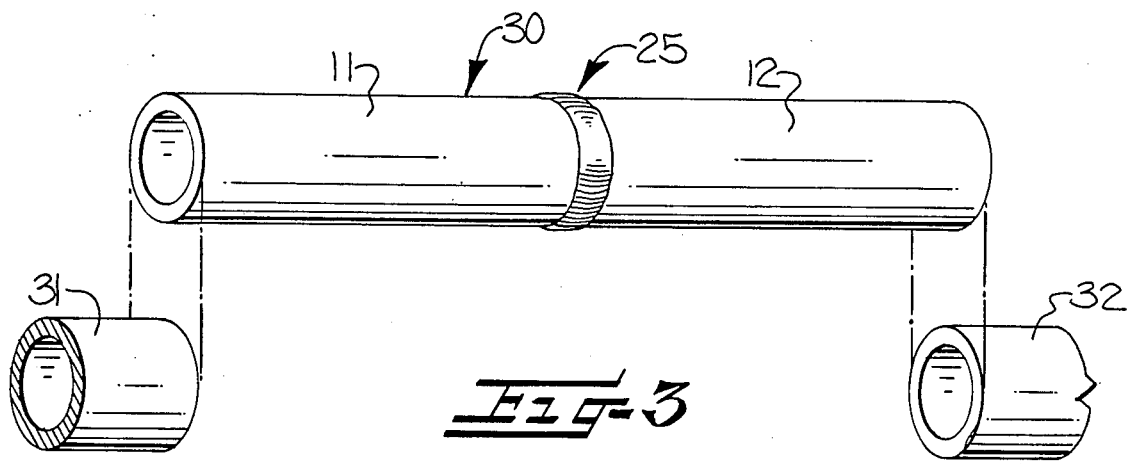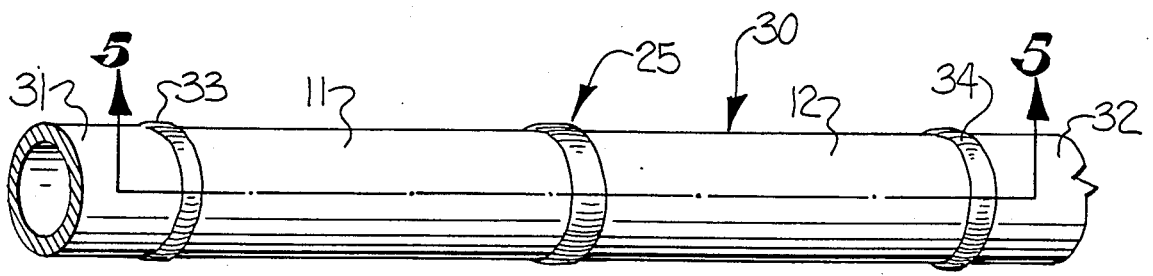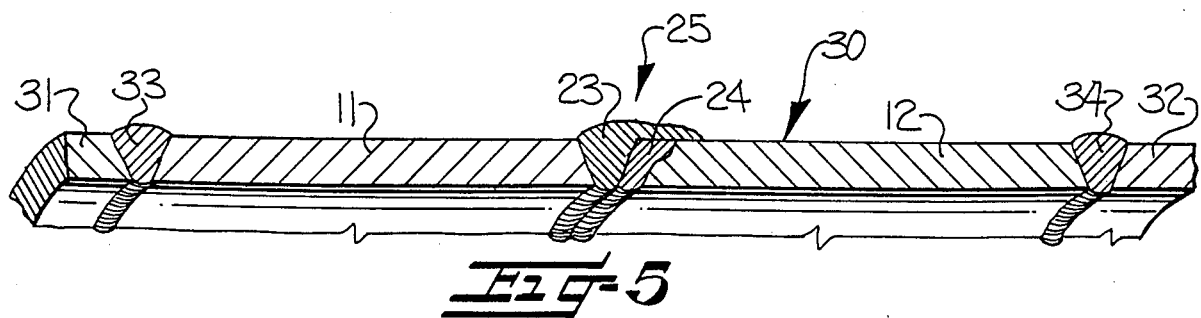

FORMING STABLE WELDED JOINTS BETWEEN DISSIMILAR METALS

FIELD OF THE INVENTION

The present invention relates to the welding of dissimilar metals and in particular to the welding of low alloy steels to austenitic stainless alloy steels.

BACKGROUND OF THE INVENTION

In a modern steam powered electric generating plant, there exist literally miles of piping for transporting water and steam, all of which piping may in its lifetime experience a wide range of temperatures. The portions of piping in such plants which carry either steam or water at extremely high temperatures and internal pressures are most preferably fabricated from materials which are commonly known in the metallurgical industries as "austenitic" stainless steels. Such steels are well suited to the intended purposes, but are generally more expensive than other types of steel. Consequently, in other portions of piping in a steam powered electric generating plant, less expensive steels known as "low-alloy" steels are used to carry water or steam having more moderate temperatures and pressures. Thus, in a typical power plant, there will occur a number of locations where the austenitic alloy steel pipe portions are joined to the low alloy steel pipe portions.

By definition, steel is an iron-base alloy containing manganese, usually carbon, and often other alloying elements. Although many types of steel may be referred to as "stainless", as used herein, "austenitic" refers to the nonhardenable, nonmagnetic type of stainless steel. As further used herein, "low alloy" refers to those steels containing not more than 5 percent total alloying elements such as chromium (Cr) and molybdenum (Mo).

Because of their thermal and mechanical environments, these joints between low alloy steel pipes and austenitic alloy steel pipes must be able to withstand high temperatures, high pressures, thermal shock, and cyclic temperature and load applications at least as well as would the individual austenitic alloy steel pipes or the individual alloy steel pipes. In steam powered electric generating plants the combined action of high operating pressures and temperatures, and the cyclic nature of these factors increases the stress on both pipes and joints between pipes. Additionally, in order to gain operating efficiency, steam powered generating plants for the last several decades have been operated at increasingly higher temperatures and pressures thereby increasing the already stressful nature of the environment in which both pipes and joints between pipes must function.

Because different materials, and in particular different metals, expand at different rates under temperature differentials, a joint between an austenitic stainless steel pipe and a low alloy steel pipe will be under particular stress where it serves as the junction between two metals which are expanding and contracting at different rates.

In addition to the temperature-induced physical stress placed upon such a welded joint, there also exist other metallurgical or chemical problems that arise when two different metals are welded to one another. Several problems are particularly troublesome: oxide notching, carbon migration and creep.

Oxide notching represents oxidation of the low alloy steel which occurs primarily at the exterior surface of the pipe joint, for example, and travels primarily along the boundary between the dissimilar metals, thereby weakening the mechanical integrity of the joint. Although specific mechanisms are not completely understood, some opinions hold that oxide notching results from electrochemical corrosion.

Carbon migration refers to a phenomenon observed whenever elevated temperatures are experienced during operation. Under such conditions, carbon has been observed to migrate from the low alloy steel to the austenitic stainless steel weld filler material or nickel-based weld filler material, whichever is being utilized. The carbon particularly tends to increase in concentration in the weld metal proximate to the weld fusion line between the two materials. The concentrated carbon compounds form at the weld interface or in the low alloy steel providing nucleation sites for high temperature failure of the weld by creep mechanisms.

"Creep" is an atomic-scale dislocation movement of alloy materials. Creep occurs at high temperatures and initially appears in the form of cavities which form at the carbide-metal interfaces and which can reduce the structural integrity of the joint.

At some point during its service lifetime, the extent of either oxide notching or creep-related cracking will dictate that the joint will have to be replaced.

In replacing such joints, a number of attempts have been made to overcome the inherent problems in welding austenitic stainless steel to low alloy steel. Generally speaking, these attempts are all aimed at using a weld material between the low alloy steel and the austenitic stainless steel which has a coefficient of thermal expansion intermediate those of the two types of steel. The object of using such a material is to buffer the differences in thermal expansion. In addition to choosing a single weld material having these characteristics, other attempts have used a series of materials or series of pipe sections of different alloys, all aimed at minimizing the differences in thermal expansion between any two adjacent portions of pipe or of the joint itself.

One method of providing such a chemical and thermal transition between austenitic stainless steels and low alloy steels has comprised the use of a welded joint having more than one portion. A first portion, sometimes known as a "butter joint", is fused to the low alloy steel portion. The butter joint is then welded to the austenitic stainless steel portion using a weld material having characteristics between those of the austenitic stainless steel and the low alloy steel. As stated earlier, such a technique attempts to stabilize the joint by providing smaller differences in chemical potential and thermal expansion between each portion of the pipes and of the joint than would exist if the two pipes were simply welded directly one to the other.

In practice these attempts have proven somewhat undesirable. Furthermore, in recent years, the difficulties associated with the joining of dissimilar metals has been compounded in steam powered generating plants by the discovery that the original welded joints between low alloy steel pipes and austenitic stainless steel pipes in such plants are subject to an unexpectedly—and unacceptable—high rate of failure and a consequent shorter-than-expected service lifetime. In particular, welds originally believed to have 40-year service lifetimes have been failing in as few as 10 years. This difficulty is straightforward in concept but overwhelming in its repair implications: i.e. the physical difficulty of performing the necessary critical welding techniques in the environments within a steam powered electrical generating plant in which certain welded joints are found. As set out above, there are literally miles of such pipes and hundreds of such joints in such plants and a tremendous number of these joints are found within the plant in locations to which access is extremely difficult. The difficulty in reaching such welds compounds the difficulty and geometrically increases the expense of replacing them as such welds must be made by highly skilled welders and in many applications, including nuclear power plants, must be X-rayed before operation can be recommenced.

There thus exists the need for a method of forming welded joints between low alloy steels and austenitic stainless steels which method provides a joint which retains its integrity in the face of extreme changes in temperature, mechanical stress and chemical corrosion. Finally, such a method should provide for the welds to be made and installed in the most economical and serviceable manner.

It is an object of this invention to provide a stable welded joint between dissimilar metals which joint is resistant to chemical corrosion and mechanical stress, has an extended service lifetime, and which can be installed in otherwise-difficult environments at a minimum of expense and logistical difficulty.

SUMMARY OF THE INVENTION

The present invention comprises a method of forming stable welded joints between low alloy steels and austenitic stainless steels. The joint formed by the invention is characterized by increased resistance to chemical corrosion and mechanical stress and has a greatly extended service lifetime. The method of forming the welded joint of the present invention comprises forming a deposit of a low alloy steel containing niobium onto a portion of low alloy steel to be welded. The deposit is heated to a first temperature at which all elements present therein exist as free atoms, and then quenched to form a solid solution of free atoms. The deposit is then reheated for a time period and at a second temperature sufficient to form niobium carbides therein containing substantially all of the carbon present in the deposit. The austenitic stainless steel portion is then welded to the deposit using a substantially nonferrous nickel-based alloy as the weld filler material to join the two steels. If desired, and as a final step before welding, a portion of the nonferrous nickel-based alloy may be added to the austenitic stainless steel portion, as part of the final complete weld between the low alloy steel portion and the austenitic stainless steel portion.

The present invention provides a welded joint which exhibits greatly increased metallurgical stability which in turn results in greater mechanical integrity and a consequent extended service lifetime. When the invention is applied to specific situations, existing inadequate welded joints can be replaced by greatly improved welded joints which can be fashioned, inspected and tested in an efficient and economical manner.

DESCRIPTION OF THE DRAWINGS

Some of the objects having been stated, other objects will appear as the description proceeds, when taken in connection with the accompanying drawings, in which—

FIG. 1 is a cross-sectional view of the wall of a pipe showing a weld of the present invention;

FIG. 2 is a cross-sectional view similar to FIG. 1 and showing a second embodiment of the invention;

FIG. 3 is a partial perspective view showing two pipe sections welded according to the present invention being rewelded into, place between existing pipes;

FIG. 4 is an illustration of the pipe section of FIG. 3 welded into place; and

FIG. 5 is a cross-sectional view taken along lines 5—5 of FIG. 4.

DETAILED DESCRIPTION OF THE INVENTION

As set forth above, the present invention comprises a method of forming a stable welded joint between dissimilar metals. The joint itself is formed from both a low alloy steel and a nonferrous nickel-based alloy. FIG. 1 illustrates a cutaway portion of a pipe wall and a weld, the cutaway portion being generally designated at 10 and the overall weld as 15. In FIG. 1, the austenitic stainless steel portion of pipe is designated at 11, the low alloy steel portion of pipe at 12, the weld filler material of substantially nonferrous nickel-based alloy at 13 and the deposit of low alloy steel containing niobium and carbon at 14. As is known to those familiar with metallurgy, the element niobium is often referred to as "columbium", but will herein be referred to by its chemical designation rather than by the common metallurgical designation.

As further known to those familiar with steels in particular, steels by definition contain mostly iron and a small percentage of carbon, and an austenitic stainless steel is a steel containing significant amounts of both chromium and nickel, as well as smaller amounts of various alloying elements and various trace elements. The most common austenitic stainless steel contains 18% chromium and 8% nickel and is known as "18-8". In addition to having a different chemical composition, austenitic stainless steel has a different crystal structure than does low alloy steel.

Low alloy steel comprises a steel having relatively small amounts of alloying elements, for example as little as 1.25% chromium and 0.5% molybdenum. In the metallurgical arts, typical steels are given common numerical designations such that some common austenitic stainless steels are numbered 201, 301, 304, 310, 316 and 347, respectively and some common low alloy steels are designated T11, T22 and T9 respectively. It is to be understood that the invention and the scope of the claims are not limited in any way by these designations but that these are set forth as illustrated designations known to those familiar with the art.

The nickel-based alloy which forms the weld filler material 13 of the weld 15, is formed from a substantially nonferrous nickel-based alloy. Several examples of such alloys are known to those in the welding and metallurgical arts as the various INCONEL brand alloys marketed by the International Nickel Co., Inc. A particular composition of such a nickel-based alloy which is useful in the present invention will be set out in more detail later herein.

The weld of the present invention formed in FIG. 1 addresses the two main problems set out earlier. The problems arising from differential thermal expansion are addressed by providing the respective portions 13 and 14 of the weld 15 wherein the nickel-based alloy portion 13 has a coefficient of thermal expansion intermediate that of the austenitic steel pipe portion 11 and the low alloy steel weld portion 14, while the low alloy steel weld portion 14 has a coefficient of thermal expansion very similar to that of the low alloy steel pipe portion 12.

As further seen in FIG. 1, in one embodiment the weld 15 has a geometry adapted to best bear the mechanical stress which the joint must withstand. In this regard, the joint is generally wider on the outside portions of the pipe than on the inside portions in order to better bear the greater flexing that mechanical stress places on the outside portions of the pipe. In this embodiment, the weld filler material 13 forms a single-V open butt weld while the second portion of low alloy steel 14 comprises a butter joint and in a preferred embodiment of the invention has a longitudinal cross section which has a substantially P-shape.

In forming the welded joint 15, the low alloy steel containing niobium is formed into the deposit 14 onto the portion of low alloy steel 12 to be welded. As is known to those in the metallurgical arts, the element niobium has a high affinity for carbon such that niobium carbide compounds are extremely stable, and do not migrate. Because of the lack of sophisticated testing equipment which could give proper indications, however, those previously familiar with such compounds did not realize nor could they observe that the simple presence of niobium does not sufficiently stabilize carbon under all circumstances. The present invention, however, provides a novel method of stabilizing carbon in the presence of niobium.

In carrying out the present invention, and in order to satisfactorily stabilize the carbides, the deposit 14, after having been formed onto the low alloy steel portion 12 to be welded, is heated along with the low alloy steel portion to a temperature at which the alloys remain solid but at which complete dissolution of the carbides has taken place. The low alloy steel portion and the heated deposit 14 are then quenched, i.e. rapidly cooled, usually in an inert gas or some sort of liquid bath. The quenching literally freezes the free atoms of the dissolved carbides in a "solid solution" rather than allowing them to slowly crystallize into their typical arrangements. The resulting solid solution is preferable in that the further crystallization of the free elements within the alloy can now be closely controlled. Were the heated deposit allowed to cool at a more normal rate, a crystallization somewhat different than that desired would take place among the respective elements and compounds which they would form. As is known to those familiar with the art and as used herein, crystallization represents an ordered combination of atoms into particular geometries.

After quenching, the deposit of niobium-containing low alloy steel is reheated a second time for a longer period at a somewhat lower second temperature. Under these conditions, almost all of the carbon present in the alloy preferentially forms niobium carbides rather than other carbon compounds with the other trace elements present. The process results in a butter joint of low alloy steel in which the carbon, which can cause problems if allowed to remain free or form other carbon compounds, is tied up or "scavenged" by the niobium. Because of the great stability of niobium carbides, the carbon neither migrates nor causes any other chemical or metallurgical problems.

Although prior techniques superficially appeared to have used similar niobium-containing low alloy steels, none of the prior techniques included the formation of either the solid solution at a high temperature or of the niobium carbides at a lower temperature. These two characteristics particularly stabilize the butter joint of the present invention in a novel fashion. Some of the laboratory techniques and equipment which can confirm such stabilization are recent enough developments such that prior techniques, while superficially appearing to use the same materials, in reality produced entirely different metallurgical structures. Such techniques include a scanning electron microscope used with an energy dispersive X-ray spectrometer; a scanning transmission electron microscope, also used with a similar spectrometer; or certain chemical extraction processes which can be useful in subsequent identification of the characteristics of such alloys (e.g. carbide compositions). Prior techniques have not been aimed at dissolving all carbides in an alloy so that they may be scavenged by niobium and thereby stabilized. Thus, in a broad sense, the invention comprises a resultant alloy having extremely stable niobium carbides and a resulting resistance to chemical corrosion and mechanical stress.

Once the butter joint is treated and stabilized, it is welded to the austenitic alloy steel portion using the single-V open butt weld formed from the nickel-based nonferrous alloy weld filler material.

Broadly stated, the goal is to use enough niobium to stabilize all of the carbon present, but not so much niobium as to cause brittleness and a resulting potential for cracking in the alloy. In one preferred embodiment of the invention, the butter joint deposit of low alloy steel includes about 1.3% niobium and the substantially nonferrous nickel-based alloy comprises between 1 to 3% niobium, 13 to 17% chromium, 6 to 12% iron, 1 to 3.5% manganese, 0.5 to 2.5% molybdenum and at least 55% nickel. In other embodiments, the nonferrous nickel-based alloy can contain between about 1 and 3% tantalum and niobium combined and about 55% nickel and cobalt combined.

A low alloy steel pipe portion such as the one illustrated at 12 could comprise up to 1.7% carbon along with small amounts of other alloying elements. Similarly, an austenitic steel alloy as typically represented by pipe portion 11 will contain between about 18 and 25% chromium and between about 8 and 20% nickel.

In preferred embodiments of the invention, the first temperature at which the elements present in the butter joint 14 are forced into their free states is between about 2200° and 2500° F., with a preferred temperature range being between about 2300° and 2400° F. The second temperature at which the solid solution is encouraged to form precipitated niobium carbide compounds is between about 1200° to 1400° F. with a preferred temperature being about 1300° F. and the time period at which said temperature is maintained is between about 40 and 60 hours with the preferred time period being about 50 hours.

Turning to FIG. 2, it will be seen that in one preferred embodiment of the invention, the cutaway pipe portion 10 has a welded joint broadly designated at 25 having a slightly different geometry from the welded joint 15 of FIG. 1. In FIG. 2, the welded joint 25 is entirely capped by the substantially nonferrous nickel-based alloy portion 23 which corresponds to the similar portion 13 in FIG. 1. The carbide-stabilized butter joint is designated at 24. The entire cap of the nickel-based alloy is desirable in some applications because of the greater corrosion resistant properties of the nickel-based alloy than of the low alloy steel.

It will be understood that while the welded joints 15 and 25 have been illustrated as being particularly suited to joining aligned pipes which have a defined passage therethrough and through said welded joint, any differing metal pieces comprising austenitic stainless steel and low alloy steel respectively can be joined according to the present invention. Although piping in steam powered electric generating plants represents one of the most pressing needs for application of the present invention, it will be understood that any joint between austenitic stainless alloy steel and low alloy steel can be successfully improved upon by the present invention. Such applications could include reactor vessels, structural members and the like and could have application in many types of power plants, factories, ships, aircraft, spacecraft, and the like.

When specifically applied to the particular problems present in steam powered electric generating plants, the method of forming the welded joint provides a specific method of correcting inadequate welded joints between pipes of dissimilar metals in such power plants. As stated earlier herein, the correction of such inadequate welds is extremely important to the industry. When using the present invention, the problem of replacing the inadequate welds can be greatly simplified, providing enormous practical advantages.

In a preferred embodiment of correcting inadequate welds using the present invention, the invention comprises removing a discrete length of a pipe section from a steam powered electric generating plant, which pipe section would have a first terminal end portion of austenitic stainless alloy steel and a second terminal end portion of low alloy steel and a welded joint therebetween. In order to correct the joint, a discrete length of replacement pipe section known as a "spool" is prepared for insertion where the discrete length of pipe section was originally removed. According to the present invention, the spool comprises a low alloy steel pipe portion corresponding to the low alloy steel pipe portion remaining in the plant, an austenitic stainless alloy steel pipe portion likewise corresponding to the austenitic stainless alloy steel pipe portion in the plant and a welded joint of the present invention uniting the low alloy steel portion and the austenitic stainless alloy steel portion. Once the spool is prepared, it can be replaced in the power plant at the point where the pipe section containing the inadequate weld was removed.

A significant advantage results from the use of the invention to prepare such spools: in preferred embodiments of the invention, the spool may be conveniently prepared under controlled conditions at a location or locations remote from the power plant environment into which the spool is to be replaced. In other words, the spool can be prepared in a machine shop or laboratory either nearby or alternatively remote from the power plant. The remote environment could be a specialized manufacturing plant, a laboratory, a testing facility, or all three in one location. The method is especially advantageous in regard to nuclear power plants because of the rigorous inspection of the welds required by law, particularly X-ray radiography and the like. Because the weld between dissimilar metals can be formed and tested at such remote locations, they can be installed with a higher degree of probability of fulfilling their expected lifetime than would otherwise be the case.

Although the spool itself must still be welded in place, inserting the spool is nevertheless much simpler than welding the dissimilar metals in situ. Replacing the spool comprises welding the low alloy steel portion of the spool to the low alloy steel pipe in the plant and welding the austenitic stainless steel alloy portion of the spool to the existing austenitic alloy stainless steel pipe in the plant. These joints between like metals are known as "field welds" and are much simpler to accomplish than are welds between dissimilar metals. The greater simplicity in replacing joints according to the present invention arises not only from the fact that like materials are being welded to one another but also from the fact that the substantially nonferrous nickel-based alloy used as the weld filler material in the open-V butt portion of the weld of the present invention is a very difficult material to handle during welding operations even though it provides a highly satisfactory weld once in place. By preparing spools at remote locations, the difficult welding operations can be performed under ideal bench conditions rather than in complex plant environments.

This method of the invention is specifically illustrated in FIGS. 3, 4 and 5. In FIG. 3 the spool, broadly designated at 30, is shown in separated perspective view from the respective austenitic stainless alloy steel pipe 31 and the low alloy steel pipe 32 already existing in the plant. In FIG. 4, the spool is shown as having been welded in place by field welds 33 and 34 respectively, with the welded joint 25 being shown in the center of the spool 30.

In FIG. 5 a cutaway view similar to that of FIG. 1 and FIG. 2 is illustrated showing the field welds 33 and 34, the welded joint of the second embodiment 25, and the walls of the respective pipe portions 31 and 32 and the austenitic stainless and low alloy steel portions of the spool 11 and 12 respectively.

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim is:

1. A metal workpiece including dissimilar metals and having increased resistance to chemical corrosion and mechanical stress and having greatly extended service life, said workpiece comprising:
   a low alloy steel portion;
   an austenitic stainless alloy steel portion; and
   a welded joint uniting said low alloy steel portion and said austenitic stainless steel portion, said welded joint comprising;
   a first deposit of a substantially nonferrous nickel-based alloy fused to said austenitic stainless steel portion; and
   a second deposit of a carbide-stabilizized niobium-containing low alloy steel fused to said low alloy steel portion and to said first deposit;
   said second deposit comprising a solid solution wherein substantially all carbon is present in the form of precipitated carbon-stabilized niobium carbides such that carbon or other carbon compounds will not migrate throughout said welded joint, thereby preventing migration-related conditions that lead to failure of said joint and of said workpiece.

2. A metal workpiece according to claim 1 in which said low alloy steel comprises:
   between about 1 and 9% chromium;

up to about 1% molybdenum, and
up to about 0.5% carbon.

3. A metal workpiece according to claim 1 in which said austenitic stainless alloy comprises between about 18 and 25% chromium and between about 8 and 20% nickel.

4. A metal workpiece according to claim 1 in which said second deposit includes about 1.3% niobium.

5. A metal workpiece according to claim 1 in which said substantially nonferrous nickel-based alloy comprises 1 to 3% niobium, 13 to 17% chromium, 6 to 12% iron, 1 to 3.5% manganese, 0.5 to 2.5% molybdenum and at least 55% nickel.

6. A metal workpiece according to claim 5 in which said second deposit comprises between about 1 and 3% tantalum and niobium combined and about 55% nickel and cobalt combined.

7. A metal workpiece including dissimilar metals and having increased resistance to chemical corrosion and mechanical stress and having greatly extended service life, said workpiece comprising:
- a low alloy steel portion having between about 1 and 9% chromium, up to about 1% molybdenum and up to about 0.5% carbon;
- an austenitic stainless alloy steel portion having between about 18 and 25% chromium and between about 8 and 20% nickel; and
- a welded joint uniting said low alloy steel portion and said austenitic stainless steel portion, said welded joint comprising;
- a first deposit of a substantially nonferrous nickel-based alloy fused to said austenitic portion and having between about 1 and 3% niobium, 13 and 17% chromium, 6 and 12% iron, 1 and 3.5% manganese, 0.5 and 2.5% molybdenum, and at least 55% nickel; and
- a second deposit of a carbide-stabilized niobium-containing low alloy steel fused to said low alloy steel portion and to said first deposit and having about 1.3% niobium;
- said second deposit comprising a solid solution wherein substantially all carbon is present in the form of precipitated carbonstabilized niobium carbides such that carbon or other carbon compounds will not migrate throughout said welded joint, thereby preventing migration-related failure of said joint and of said workpiece.

8. A metal workpiece according to claim 7 in which said low alloy steel portion and said austenitic stainless alloy steel portion comprise respective aligned pipes having a passage defined therethrough and through said welded joint.

9. A welded joint formed between low alloy steel and austenitic stainless alloy steel and having a greatly extended service lifetime and greater resistance to chemical corrosion and mechanical stress, said joint comprising:
- a first deposit of a substantially nonferrous nickel-based alloy fused to a portion of austenitic stainless alloy steel to be welded;
- a second deposit of a carbide-stabilized, niobium-containing low alloy steel fused to a portion of low alloy steel to be welded and to said first deposit;
- said second deposit comprising a solid solution wherein substantially all carbon is present in the form of precipitated carbon-stabilized niobium carbides such that carbon or other carbon compounds will not migrate throughout said welded joint, thereby preventing migration related failure of said joint.

10. A welded joint between an austenitic stainless alloy steel pipe and a low alloy steel pipe, said joint being characterized by an increased resistance to chemical corrosion and mechanical stress and having a greatly extended service life, said welded joint comprising:
- a first deposit of a substantially nonferrous nickel-based alloy fused to said austenitic stainless alloy steel pipe and comprising a single-V open butt weld;
- a second deposit of a carbide-stabilized niobium-containing low alloy steel fused to said low alloy steel pipe and to said first deposit;
- said second deposit comprising a solid solution wherein said substatially all carbon is present in the form of precipitated carbon-stabilized niobium carbides such that carbon or other carbon compounds will not migrate throughout said welded joint, thereby preventing migration-related failure of said joint; and
- said second deposit forming a butter joint, a longitudinal cross section of which has a substantially P-shape.

11. A welded joint according to claim 10 further comprising a cap formed of said substantially nonferrous nickel-based alloy overlying said entire welded joint and overlying portions of said low alloy steel pipe and portions of said austenitic stainless alloy steel pipe.

12. A method of forming a stable welded joint between low alloy steels and austenitic stainless alloy steels, said joint being characterized by increased resistance to chemical corrosion and mechanical stress and having a greatly extended service lifetime, said method comprising:
- forming a deposit of a low alloy steel containing niobium onto a portion of low alloy steel to be welded;
- heating said deposit to a first temperature at which all carbides present therein have dissolved;
- quenching said deposit and forming a solid solution of the elements of said dissolved carbides;
- reheating said deposit for a time period and at a second temperature sufficient to form niobium carbides therein containing substantially all of the carbon present in said deposit; and
- welding said austenitic stainless steel portion to said deposit using a substantially nonferrous nickel-based alloy as the weld filler material thereby joining said low alloy steel portion to said austenitic stainless steel portion.

13. A method according to claim 12 wherein said first temperature is between about 2200° and 2500° F.

14. A method according to claim 12 wherein said second temperature is between about 1200° and 1400° F.

15. A method according to claim 12 wherein said time period is between about 40 and 60 hours.

16. A method according to claim 12 wherein said respective portions of low alloy steel and austenitic stainless alloy steel comprise aligned pipes having a defined passage therethrough and through said welded joint.

17. A method of forming a stable welded joint between low alloy steel pipes and austenitic stainless alloy steel pipes, said joint being characterized by increased resistance to chemical corrosion and mechanical stress and having a greatly extended service lifetime, said method comprising:

forming a deposit of a low alloy steel containing niobium onto a portion of low alloy steel pipe to be welded;

heating said deposit to a first temperature of between about 2300° and 2400° F. and at which all carbides present therein have dissolved;

quenching said deposit and forming a solid solution of the elements of the dissolved carbides;

reheating said deposit for about 50 hours at a second temperature of about 1300° F. sufficient to form niobium carbides therein containing substantially all of the carbon present in said deposit; and welding said austenitic stainless steel portion to said deposit using a substantially nonferrous nickel-based alloy as the weld filler material, thereby joining said low alloy steel pipe to said austenitic stainless alloy steel pipe.

18. A method according to claim 17 further comprising the step of adding a deposit of the substantially non-ferrous nickel base alloy to the deposit of low alloy steel containing niobium after said reheating step and prior to said welding step, and thereafter welding the austenitic stainless steel portion to the deposit of nickel-base alloy using a substantially nonferrous nickel-based alloy as the weld filler material, to thereby join the low alloy steel pipe to the austenitic stainless alloy steel pipe.

19. A method of correcting an inadequate welded joint between pipes of dissimilar metals in a steam powered electric generating plant which welded joints are of the type having an unacceptable predicted occurrence of failure in steam powered electric generating plants, and wherein the dissimilar metals comprise an austenitic stainless alloy steel portion joined to a low alloy steel portion, said method comprising:

(a) removing a discrete length of pipe section from a steam powered electric generating plant, said pipe section having a first terminal end portion of austenitic stainless alloy steel, a second terminal end portion of low alloy steel and a welded joint therebetween;

(b) preparing a spool for replacement in said power plant, said spool being of a discrete length substantially similar to the discrete length of the pipe section removed and having;

a low alloy steel pipe portion, an austenitic stainless alloy steel pipe portion, and a welded joint uniting said low alloy steel portion and said austenitic stainless alloy steel portion, said welded joint comprising.

a first deposit of a substantially non-ferrous nickel-based alloy fused to said austenitic stainless alloy steel portion, and a second deposit of a carbide-stabilized niobium-containing low alloy steel fused to said low alloy steel portion and to said first deposit, said second deposit comprising a solid solution wherein substantially all carbon is present in the form of precipitated carbon-stabilized niobium carbides such that carbon or other carbon compounds will not migrate throughout said welded joint, thereby preventing migration-related failure of said joint and of said workpiece; and (c) replacing said spool in said power plant at the point where said pipe section was removed and forming field welds joining said austenitic stainless alloy steel pipe portion to an existing austenitic stainless alloy steel pipe portion in said plant and joining said low alloy steel pipe portion to an existing low alloy steel pipe portion in said plant, thereby providing piping and associated welded joints in said plant having increased resistance to chemical corrosion and to mechanical stress and a resulting extended service lifetime.

20. A method according to claim 19 wherein said spool is prepared under controlled conditions at a location remote from the steam powered electric generating plant environment into which said spool is to be replaced.

21. A method according to claim 19 including testing said spool at said remote location.

22. A method of forming stable carbides in low alloy steels and thereby producing resultant alloys having increased resistance to chemical corrosion and to mechanical stress, said method comprising:

heating a low alloy steel containing niobium to a first temperature at which all carbides present in said alloy have dissolved;

quenching said alloy and forming a solid solution of the elements of the dissolved carbides; and reheating said alloy for a time period and at a second temperature sufficient to selectively form niobium carbides therein containing substantially all of the carbon present in said low alloy steel.

23. A method according to claim 22 wherein said first temperature is between about 2200° and 2500° F.

24. A method according to claim 22 wherein said second temperature is between about 1200° and 1400° F.

25. A method according to claim 22 wherein said time period is between about 40 and 60 hours.

26. A method of forming stable carbides in low alloy steels and of producing a resultant alloy having increased resistance to chemical corrosion and to mechanical stress, said method comprising:

heating a low alloy steel containing niobium to a temperature of about 2400° F. and dissolving all carbides present in said alloy;

quenching said alloy and forming a solid solution of the elements of the dissolved carbides; and reheating said alloy for about 50 hours at a temperature of about 1300° F. and selectively forming niobium carbides therein containing substantially all of the carbon present in said low alloy steel.

* * * * *